(12) United States Patent
Yoon et al.

(10) Patent No.: US 10,222,616 B2
(45) Date of Patent: Mar. 5, 2019

(54) BACKLIGHT UNIT FOR HEAD-UP DISPLAY APPARATUS

(71) Applicant: HYUNDAI MOBIS CO., LTD., Yongin-si, Gyeonggi-do (KR)

(72) Inventors: Chan Young Yoon, Gwangmyeong-si (KR); Sang Hoon Han, Seoul (KR); Uhn Yong Shin, Yongin-si (KR)

(73) Assignee: HYUNDAI MOBIS CO., LTD., Yongin-si (KR)

( * ) Notice: Subject to any disclaimer, the term of this patent is extended or adjusted under 35 U.S.C. 154(b) by 0 days.

(21) Appl. No.: 15/629,022

(22) Filed: Jun. 21, 2017

(65) Prior Publication Data

US 2018/0011316 A1 Jan. 11, 2018

(30) Foreign Application Priority Data

Jul. 11, 2016 (KR) ........................ 10-2016-0087376

(51) Int. Cl.
*G02B 27/01* (2006.01)
*G02F 1/01* (2006.01)
*G02B 19/00* (2006.01)

(52) U.S. Cl.
CPC ..... *G02B 27/0101* (2013.01); *G02B 19/0028* (2013.01); *G02B 19/0061* (2013.01); *G02F 1/01* (2013.01); *B60R 2300/205* (2013.01)

(58) Field of Classification Search
CPC ............ G02B 27/0101; G02B 19/0028; G02B 19/0061; G02F 1/01; B60R 2300/205
See application file for complete search history.

(56) References Cited

U.S. PATENT DOCUMENTS

2015/0316765 A1* 11/2015 Kim ...................... H04N 5/247
345/7

FOREIGN PATENT DOCUMENTS

JP       2010-76666 A     4/2010

* cited by examiner

*Primary Examiner* — David V Bruce
(74) *Attorney, Agent, or Firm* — Knobbe Martens Olson & Bear LLP

(57) ABSTRACT

A backlight unit in a head-up display apparatus according to the present disclosure includes A plurality of light sources configured to emit light; a plurality of primary light collectors configured to collect the light emitted by the plurality of light sources to transmit, refract, or reflect the collected light; and a secondary light collector configured to recollect the light which is collected by the plurality of primary light collectors. At this point, an optical axis of one among the plurality of light sources, the plurality of primary light collectors, and the secondary light collector is disposed to be different from the other two.

12 Claims, 11 Drawing Sheets

——·—— : OPTICAL AXIS OF LIGHT SOURCE

—————— : OPTICAL AXIS OF LIGHT COLLECTOR

——·—— : OPTICAL AXIS OF LIGHT SOURCE

—————— : OPTICAL AXIS OF LIGHT COLLECTOR

BACKLIGHT UNIT FOR HEAD-UP DISPLAY APPARATUS

CROSS-REFERENCE TO RELATED APPLICATION

This application claims priority to and the benefit of Korean Patent Application No. 2016-0087376, filed on Jul. 11, 2016, the disclosure of which is incorporated herein by reference in its entirety.

BACKGROUND

1. Field of the Invention

The present disclosure relates to a backlight unit for a head-up display apparatus.

2. Discussion of Related Art

A display apparatus for a vehicle effectively transmits information to a driver while the vehicle is traveling. A representative example of the display apparatus for a vehicle is a head-up display apparatus.

Such a head-up display apparatus includes a backlight unit for collecting light emitted from a light-emitting diode (LED) source and effectively transmitting the collected light to a panel.

FIG. 1A and FIG. 1B are a diagram for describing a configuration of a backlight unit. FIG. 2A and FIG. 2B are diagrams for describing a problem of a backlight unit according to a related art.

Referring to FIG. 1A and FIG. 1B, the backlight unit may employ a single LED or a plurality of LEDs according to a brightness requirement of a head-up display apparatus. At this point, a method for collecting light from an LED generally includes a lens method, shown in FIG. 1A and a reflector method, shown in FIG. 1B.

A backlight unit employing the lens method shown in FIG. 1A is configured with a light source 11 and a lens 13. A backlight unit employing the reflector method shown in FIG. 1B is configured with a light source 11' and a reflective reflector 13'.

In a general structure of such a backlight unit, a normal line including the center point of a light emitting surface of the LED is defined as an optical axis of a light source, and the optical axis of the light source and an optical axis of an optical component for collecting light are configured to coincide with each other.

In this case, however, when the optical axis is disposed at the center of an eyebox a as shown in FIG. 2A, a problem in brightness uniformity does not occur, however a phenomenon in which brightness uniformity is degraded does occur as the optical axis moves toward a lateral surface inside the eyebox a shown in FIG. 2B.

When a scattering angle of a diffuser is increased to compensate for such a problem, a problem in that uniformity is improved but brightness is degraded occurs.

In this regard, a head-up display apparatus for projecting a display image on a projection member is disclosed in Japanese Patent Application Publication No. 2010-76666 (entitled, Head-Up Display Apparatus).

SUMMARY OF THE INVENTION

In accordance with embodiments of the present disclosure, a backlight unit for a head up display apparatus including transmission type and reflection type light collecting structures capable of simultaneously efficiently transmitting light energy emitted from a light source to a display panel and improving brightness uniformity is provided.

However, technical objectives of the present embodiments are not limited to the described above, and other technical objectives exist.

To attain the above-described objective, a backlight unit in a head-up display according to one aspect of the present disclosure includes a plurality of light sources configured to emit light; a plurality of primary light collectors configured to collect the light emitted by the plurality of light sources to transmit, refract, or reflect the collected light; and a secondary light collector configured to recollect the light which is collected by the plurality of primary light collectors, wherein an optical axis of one among the plurality of light sources, the plurality of primary light collectors, and the secondary light collector is disposed to be different from the other two.

When a light emitting part of the light source is a surface, the optical axis of the light source may be defined by a center point of the light emitting part and a normal line including the center point.

The optical axis of the light source may include a vector component in a propagation direction in which intensity of the light is highest in an intensity distribution of the light emitted by the light source.

The optical axis of the light source may be disposed to be different from the optical axis of the primary light collector.

The plurality of primary light collectors may be a plurality of lenses, and each of the plurality of lenses may collect the light emitted by each of the plurality of light sources to transmit and refract the collected light.

Each of the plurality of lenses may be a spherical or aspherical surface lens, and the optical axis of each of the plurality of primary light collectors may be set to be a rotational axis of each of the plurality of lenses.

The plurality of primary light collectors may be a plurality of reflection type reflectors, and each of the plurality of reflection type reflectors may collect and reflect the light emitted by each of the plurality of light sources.

An optical axis including a center of a light incident part of the reflection type reflector may be set to be disposed to be different from an optical axis including a center of a light emitting part of the reflection type reflector, and the optical axis of the light source may be disposed to be different from the optical axis including the center of the light emitting part of the reflection type.

The plurality of primary light collectors may be a plurality of lenses, and the optical axis of each of the plurality of light sources may be disposed to be different from one or more of an optical axis including a center of a light incident surface of each of the plurality of lenses and an optical axis including a center of a light emitting surface of each of the plurality of lenses.

The optical axis of the light source may be disposed to coincide with the optical axis of the primary light collector, and the optical axis of the primary light collector may be disposed to be different from the optical axis of the secondary light collector.

The plurality of primary light collectors may be a plurality of lenses, and each of the plurality of lenses may collect the light emitted by each of the plurality of light sources to transmit and refract the collected light.

Each of the plurality of lenses may be a spherical or aspherical surface lens, and the optical axis of each of the plurality of primary light collectors may be set to a rotational axis of each of the plurality of lenses.

The plurality of primary light collectors may be a plurality of reflection type reflectors, and each of the plurality of reflection type reflectors may collect and reflect the light emitted by each of the plurality of light sources.

An optical axis including a center of a light incident part of the reflection type reflector may be set to be disposed to be different from an optical axis including a center of a light emitting part of the reflection type reflector, and the optical axis of the light source may be disposed to be different from the optical axis including the center of the light emitting surface of the reflection type reflector.

A diffuser disposed between the primary light collector and the secondary light collector or between the secondary light collector and a display panel, and configured to diffuse incident light may be further included.

According to one of the objectives of the present disclosure, by using an off-axis optical structure between a light source of a picture generation unit (PGU) for a head-up display apparatus and light collecting components, brightness may be improved and brightness uniformity can be increased.

Thus, visibility of driving information may be increased while a driver drives a vehicle so that convenience of the driver may be improved.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
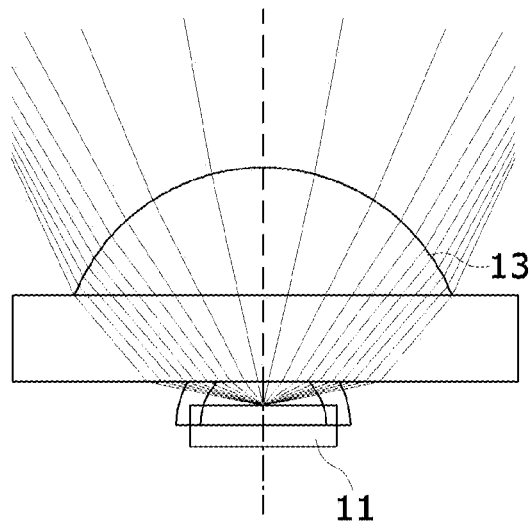
FIG. 1A and FIG. 1B are a diagram for describing a configuration of a backlight unit.
Figure 1B:
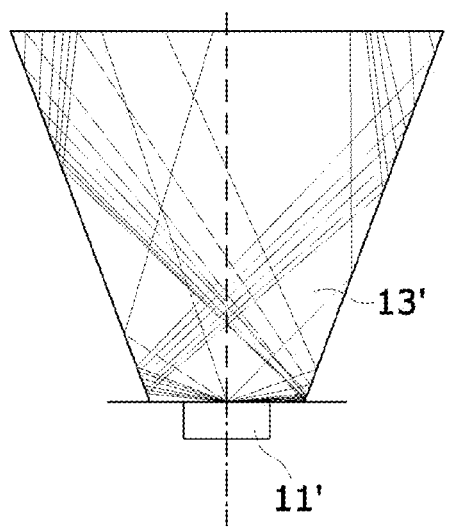
Figure 2A:
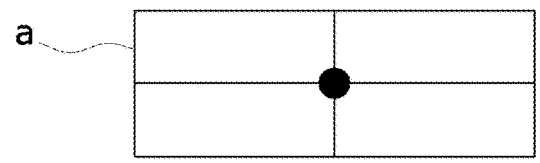
FIG. 2A and FIG. 2B are diagrams for describing a problem of a backlight unit according to a related art.
Figure 2B:
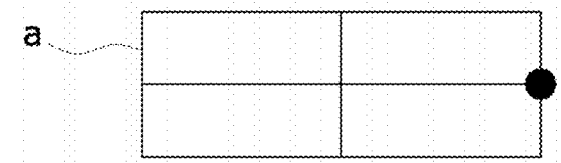

Embodiments of the present disclosure will be described in detail below so that those skilled in the art may easily implement the embodiments with reference to the accompanying drawings. However, the present disclosure may be implemented in various different forms and is not limited to the embodiments which will be described herein. In the drawings, some portions not related to the description will be omitted in order to clearly describe the present disclosure, and similar reference numerals are given to similar components throughout the disclosure.

Throughout the disclosure, when a part is referred to as being "connected" to another part, the description includes not only a case in which the part is "directly connected" to the other part but also a case in which the part is "electrically connected" to the other part via another component.

Throughout the disclosure, when a member is referred to as being positioned "on" other member, the description includes not only a case in which the member comes into contact with the other member but also a case of another member existing between the member and the other member.

Throughout the disclosure, when an element is referred to as "comprising" another element," the description refers to a case in which the element includes the other element and doesn't exclude a case in which yet another element is included unless specifically stated otherwise. The terms "about," "substantially," and the like are used herein to refer to a value or a meaning close to a value when inherent manufacturing and material tolerances are provided in the mentioned meanings, and are used to prevent an unscrupulous infringer from exploiting precise or absolute numbers that are disclosed to facilitate understanding of the present disclosure. The extent term of "a step doing something," or "a step of something" used herein does not refer to "a step for something."

The present disclosure relates to a backlight unit 100 or 100' in a head-up display apparatus 1.

In accordance with one embodiment of the present disclosure, the backlight unit 100 or 100' for the head-up display apparatus 1, which includes transmission type and reflection type light collecting structures capable of simultaneously effectively delivering light energy output from a light source 110 or 110' to a display panels 200 or 200' and improving brightness uniformity by disposing an optical axis of one among the light source 110 or 110', a primary light collector 120 or 120', and a secondary light collector 130 or 130' differently from the other two.

However, one embodiment of the present disclosure is not limited to being applied to the head-up display apparatus 1, and the embodiment may be applied to a display device of an electric/electronic device for a vehicle, such as a navigation for a vehicle. Hereinafter, the backlight unit 100 or 100' in the head-up display apparatus 1 according to one embodiment of the present disclosure will be described with reference to FIG. 3 to FIG. 11C.

Figure 3:
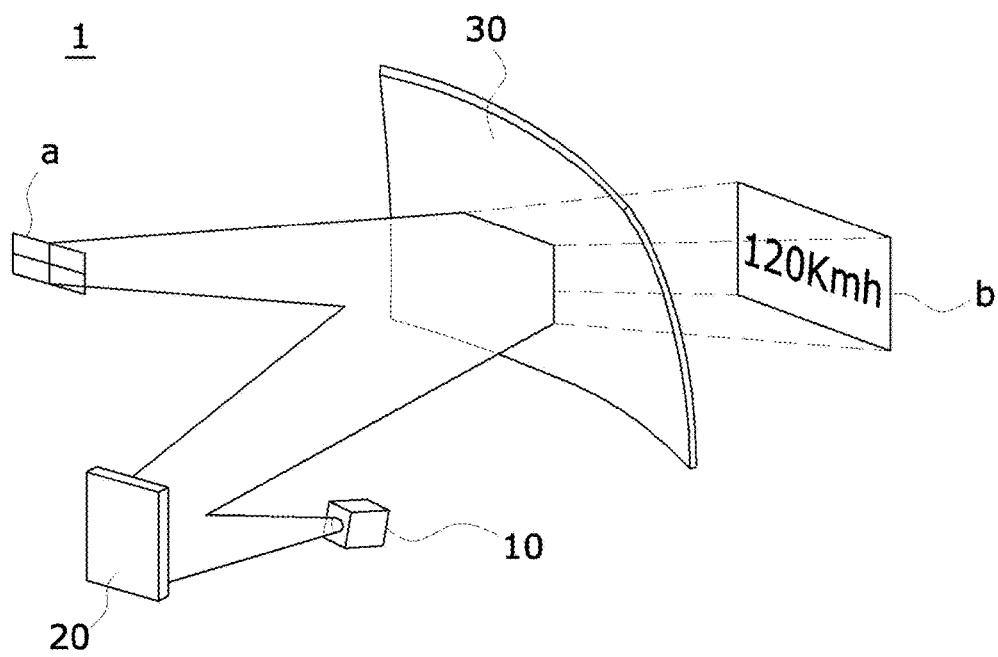
FIG. 3 is a diagram illustrating a general configuration of a head-up display apparatus according to one embodiment of the present disclosure.

FIG. 3 is a diagram illustrating a general configuration of a head-up display apparatus 1 according to one embodiment of the present disclosure.

The head-up display apparatus 1 is a convenience apparatus configured to project information required for driving a vehicle as images on a windshield 30 in a direction of the eyes of a driver, wherein the information includes a current speed, a remaining fuel amount, navigation, and the like.

Such a head-up display apparatus 1 may be provided at a driver's seat side of a vehicle. In detail, the head-up display apparatus 1 may be installed inside an instrument panel disposed in front of the driver in the vehicle.

The head-up display apparatus 1 includes an image output device 10 which is configured with the backlight unit 100 or 100' and the display panel 200 or 200'. When light emitted from the backlight unit 100 or 100' passes the display panel 200 or 200', the image output device 10 may generate images corresponding to driving information of a vehicle and navigation information thereof.

At this point, the display panels 200 and 200' may employ a liquid crystal display (LCD) but are not limited thereto, and a method including a liquid crystal on silicon (LCOS), a digital micromirror device (DMD), a digital light processing (DLP), a scanner, or the like may be employed.

A reflecting plate 20 reflects an image output from the image output device 10 toward the windshield 30.

The image reflected by the reflecting plate 20 is projected on the windshield 30. The image projected on the windshield 30 as described above is formed inside an eyebox a of the driver. As the image is formed inside the eyebox a, the head-up display apparatus 1 may provide the driver with the driving information of the vehicle.

At this point, display information output by the display panel 200 or 200' is collected in the eyebox a by an optical system with magnification, and the driver may see a virtual image b over the windshield 30 by keeping his/her eyes in the eyebox a.

As described above, the backlight unit 100 or 100' including the light source 110 or 110' need to output the display information on the display panel 200 or 200'. At this point, the backlight units 100 and 100' may be configured with optical components such as a plurality of lenses or reflectors, a diffuser, and the like, and the backlight units 100 and 100' will be described in detail with reference to FIGS. 4A and 4B.

Figure 4A:
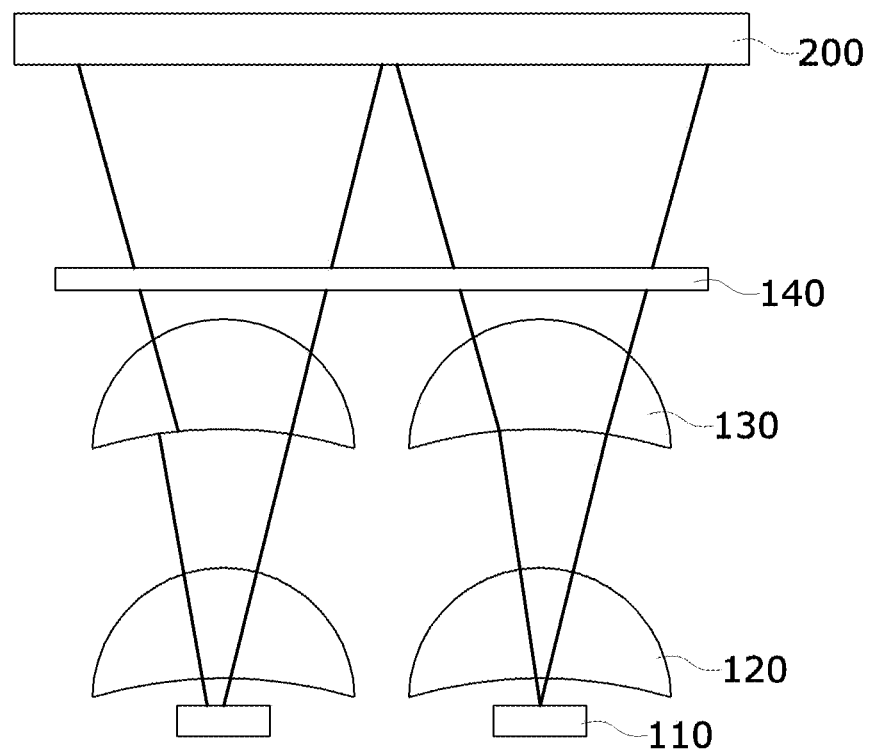
FIG. 4A and FIG. 4B are diagrams for describing a backlight unit for a head-up display apparatus according to one embodiment of the present disclosure.
Figure 4B:
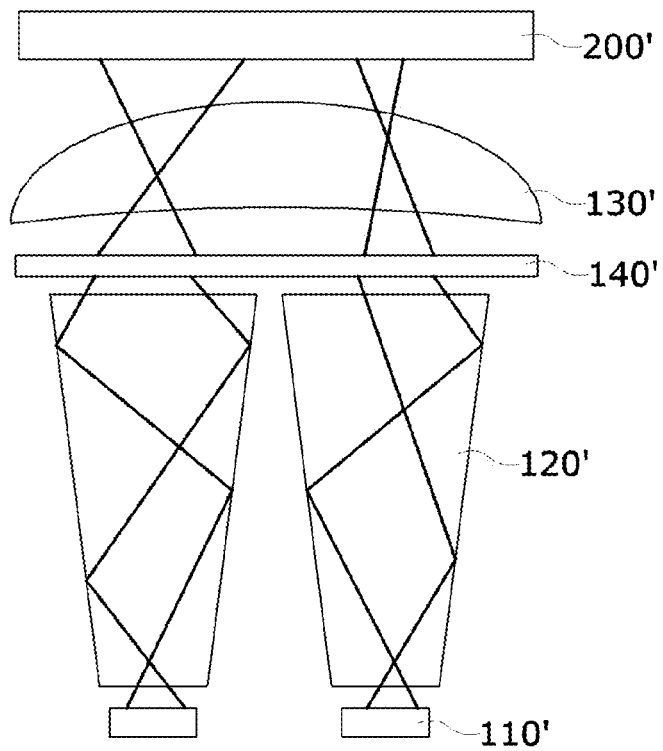

FIG. 4A and FIG. 4B are diagrams for describing the backlight unit 100 or 100' in the head-up display apparatus 1 according to one embodiment of the present disclosure.

The backlight unit 100 or 100' in the head-up display apparatus 1 according to one embodiment of the present disclosure includes the light source 110 or 110', the primary light collector 120 or 120', and the secondary light collector 130 or 130'.

The light source 110 or 110' may emit light, and a plurality of light sources 110 or 110' may be provided. That is, the light source 110 or 110' may be configured with a plurality of light sources to increase brightness of an image generated on the display panel 200 or 200', and, as the number of light sources 110 or 110' is increased, the brightness of the image output by the display panel 200 or 200' may be increased.

The amount of light and the number of the light sources 110 or 110' may be set according to a brightness required in the head-up display apparatus 1.

Meanwhile, although not shown in the drawing, the light source 110 or 110' may be installed at one lateral surface of a printed circuit board.

The light sources 110 and 110' may be light-emitting diodes (LEDs) which generate bright light with low power. A white LED may be mainly applied as the LED, or a combination of a red LED, a green LED, and a blue LED may be applied as the LED. However, the LED is not necessarily limited to the above description, and an electro luminescence (EL), a cold cathode fluorescent lamp (CCFL), a hot cathode fluorescent lamp (HCFL), a laser, and the like may be employed as the light source.

Figure 5A:
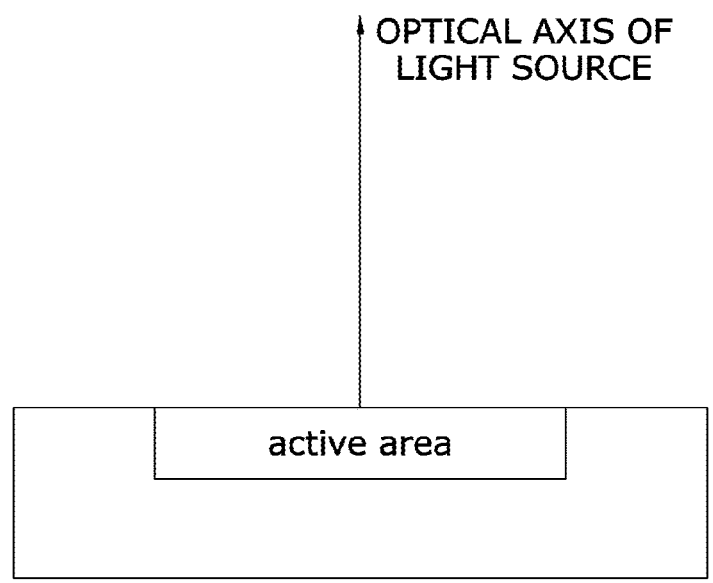
FIG. 5A and FIG. 5B are a diagram for describing an optical axis of a light source in one embodiment of the present disclosure.
Figure 5B:
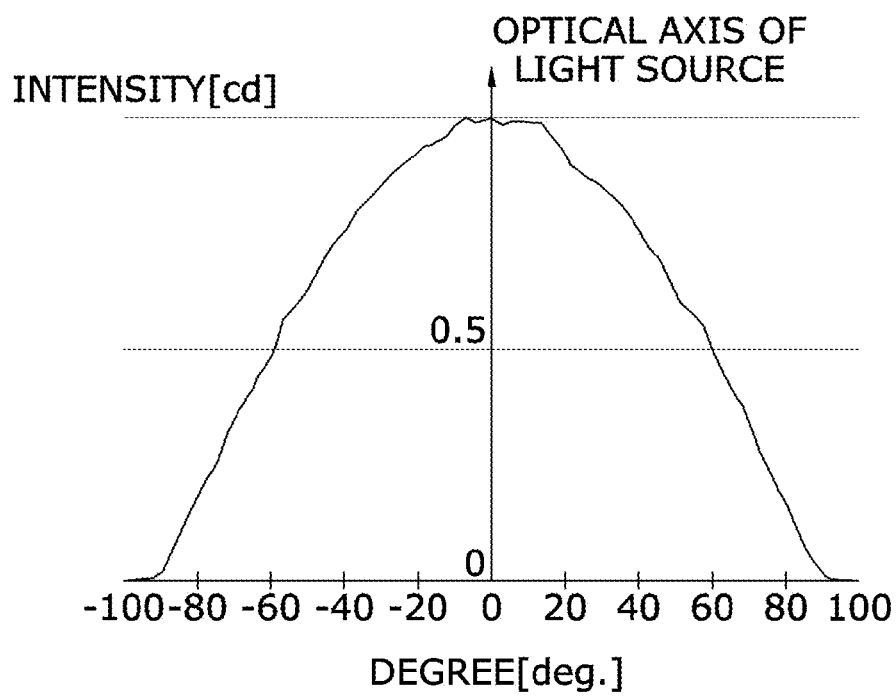

Here, an optical axis of each of the light sources 110 and 110' may be defined as shown in FIG. 5A and FIG. 5B.

FIG. 5A and FIG. 5B are a diagram for describing an optical axis of each of the light sources 110 and 110' in one embodiment of the present disclosure.

As shown in FIG. 5A, when a light emitting part of the light sources 110 and 110' is a surface, a center point of a light emitting surface and a normal line including the center point may be defined as an optical axis of the light sources 110 and 110'.

Also, as shown in FIG. 5B, an axis including a vector component in a propagation direction in which intensity of light is highest in an intensity distribution of the light emitted by the light sources 110 and 110' may be defined as the optical axis of the light sources 110 and 110'.

Referring back to FIG. 4A and FIG. 4B, the primary light collector 120 or 120' serves to transmit light to the secondary light collector 130 or 130' by collecting and transmitting or reflecting the light emitted by the plurality of light sources 110 or 110'.

A plurality of primary light collector 120 or 120' may be provided, and the number of primary light collectors 120 or 120' may be same or less than the number of light sources 110 or 110'.

Such a primary light collector 120 or 120' may be configured with a plurality of lenses 120 or a plurality of reflection type reflectors 120'.

The secondary light collector 130 or 130' recollects the light which is collected by the primary light collector 120 or 120'.

The secondary light collector 130 or 130' recollect the light which is collected by the primary light collector 120 or 120' to improve linearity of the light.

Also, the backlight unit 100 or 100' according to one embodiment of the present disclosure may further include diffuser 140 or 140' which diffuse incident light.

The diffuser 140 or 140' may be disposed between the primary light collector 120 or 120' and the secondary light collector 130 or 130' or between the secondary light collector 130 or 130' and the display panel 200 or 200'.

The diffuser 140 or 140' serves to diffuse incident light so that the display panel 200 or 200' may output an image with more uniform brightness.

Meanwhile, the backlight unit 100 or 100' according to one embodiment of the present disclosure may be formed with a transmission type light collecting structure 100 or a reflection type light collecting structure 100'.

First, FIG. 4A illustrates the backlight unit 100 having the transmission type light collecting structure, and light emitted by the light source 110 may sequentially pass through the primary light collector 120, the secondary light collector 130, the diffuser 140, and the display panel 200.

In the backlight unit 100 having the transmission type light collecting structure, the primary light collector 120 may be configured with a plurality of lenses, and each of the plurality of lenses may collect, transmit and refract the light emitted by the light source 110. At this point, each of the plurality of lenses may be a spherical or aspherical surface lens.

Also, an optical axis of the primary light collector 120 may be set to a rotational axis of each of the plurality of lenses.

The number of secondary light collectors 130 may be provided to be the same as the number of primary light collectors 120, but it is not limited thereto.

Next, FIG. 4B illustrates the backlight unit 100' having the reflection type light collecting structure, and light emitted by the light source 110' may sequentially pass through the primary light collector 120', the diffuser 140', the secondary light collector 130', and the display panel 200'.

In the backlight unit 100' having the reflection type light collecting structure, the primary light collector 120' may be a plurality of reflection type reflectors. Each of the plurality of reflection type reflectors may collect and reflect light emitted by each of a plurality of light sources 110'.

At this point, an optical axis including the center of a light incident part(surface, window or hole) of each of the plurality of reflection type reflectors may be set to be disposed to be different from an optical axis including the center of a light emitting surface of each of the plurality of reflection type reflectors. Consequently, an optical axis of the light source 110' may be set to be disposed to be different from the optical axis including the center of the light emitting part (surface, window or hole) of reflection type reflectors.

Meanwhile, for convenience of description, the light emitted by the light source 110 or 110' is shown in FIG. 4A and FIG. 4B as passing through optical components according to a predetermined order, but it is not limited thereto, and a disposition order of the optical components may be changed according to an optical design.

In the backlight unit 100 or 100' according to one embodiment of the present disclosure, the optical axis of one among the light source 110 or 110', the primary light collector 120 or 120', and the secondary light collector 130 or 130' may be disposed to be different from the other two, and this will be described with reference to FIG. 6A to FIG. 9B.

FIG. 6A to FIG. 7B are diagrams for describing an optical axis in the backlight unit 100 having the transmission type light collecting structure, and FIG. 8A to FIG. 9B are diagrams for describing an optical axis in the backlight unit 100' having the reflection type light collecting structure.

Figure 6A:
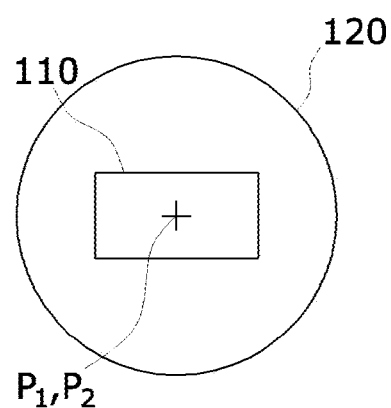
FIGS. 6A, 6B, 7A and 7B are diagrams for describing an optical axis in a backlight unit having a transmission type light collecting structure.
Figure 6B:
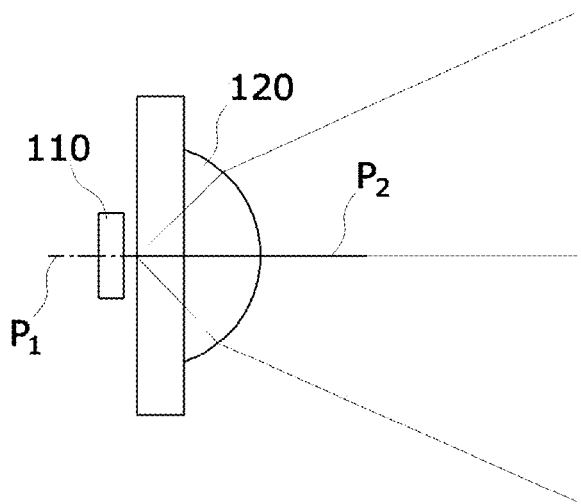

FIG. 6A and FIG. 6B illustrate a case in which an optical axis $P_1$ of the light source 110 coincides with an optical axis $P_2$ of the primary light collector 120. In a case in which light emitted along the optical axis $P_1$ of the light source 110 is referred to as central light, when the optical axis $P_1$ of the light source 110 coincides with the optical axis $P_2$ of the primary light collector 120 as shown in FIG. 6A, the central light propagates in a direction in which the optical axes $P_1$ and $P_2$ of the light source 110 and the primary light collector 120 coincide with each other (that is, $P_1=P_2$) as shown in FIG. 6B.

Figure 7A:
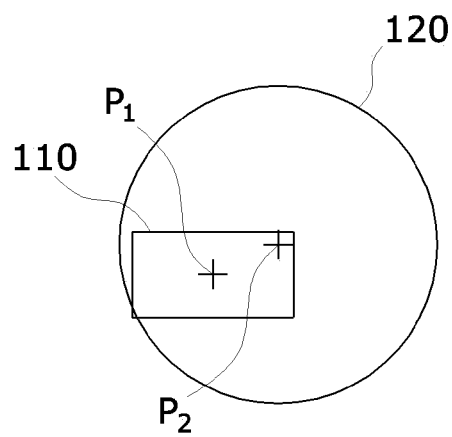

However, in the backlight unit 100 according to one embodiment of the present disclosure, as shown in FIG. 7A, the optical axis $P_1$ of the light source 110 is set to be disposed to be different from the optical axis $P_2$ of the primary light collector 120 (that is, $P_1 \neq P_2$).

In particular, the optical axis $P_1$ of the light source 110 may be set to be disposed to be different from one or more of the optical axis $P_2$ including the center of a light incident surface of each of the plurality of lenses 120 (that is, the primary light collector) and the optical axis $P_2$ including the center of a light emitting surface of each of the plurality of lenses 120.

Figure 7B:
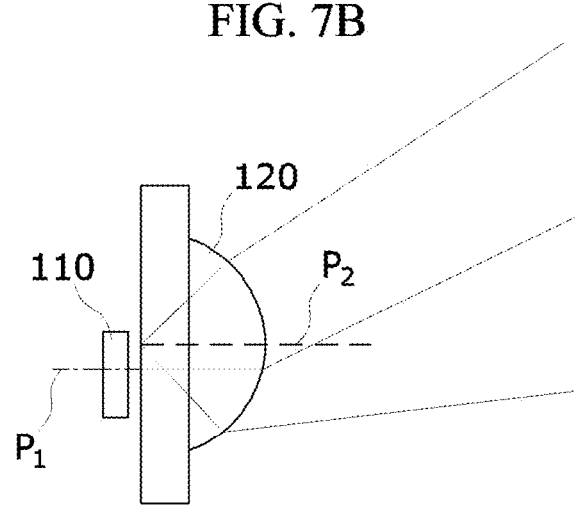

Consequently, as shown in FIG. 7B, a light distribution of the central light is not parallel to the optical axis $P_1$ or $P_2$, and the central light is deviated from the optical axis $P_1$ or $P_2$ and propagates.

Figure 8A:
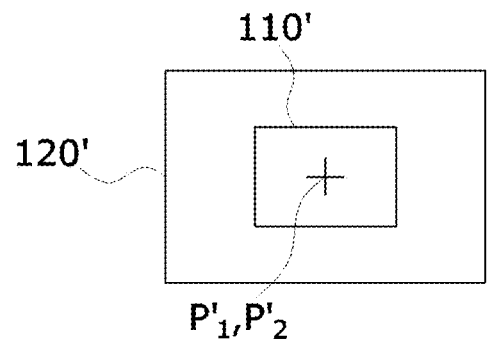
FIGS. 8A, 8B, 9A and 9B are diagrams for describing an optical axis in a backlight unit having a reflection type light collecting structure.
Figure 8B:
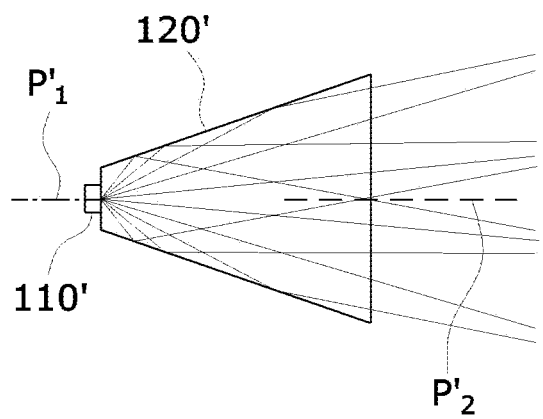

Next, even in the reflection type light collecting structure shown in FIG. 8A, when an optical axis $P_1'$ of the light source 110' is set to coincide with an optical axis $P_2'$ of the primary light collector 120', light emitted by a light emitting surface of the reflection type reflector 120' is emitted to have a uniform light distribution, as shown in FIG. 8B.

Figure 9A:
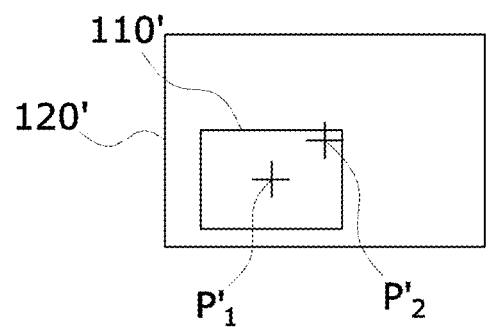

Conversely, in the backlight unit 100' according to one embodiment of the present disclosure, as shown in FIG. 9A, the optical axis $P_1'$ of the light source 110' is set to be disposed to be different from the optical axis $P_2'$ of the reflection type reflector, that is, the primary light collector 120' (that is, $P_1' \neq P_2'$).

In particular, according to one embodiment of the present disclosure, the optical axis $P_1'$ of the light source 110' may be set to be disposed to be different from the optical axis $P_2'$ including the center of the light emitting surface of the reflection type reflector 120'.

Figure 9B:
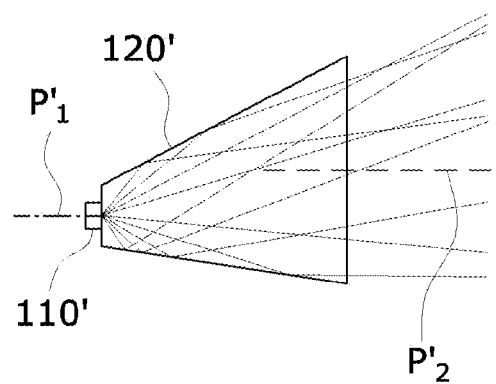

Consequently, as shown in FIG. 9B, light emitted by the light emitting surface of the reflection type reflector 120' is emitted to have a deviated light distribution.

Meanwhile, although a case in which the optical axis $P_1$ or $P_1'$ of the light sources 110 or 110' and the optical axis $P_2$ or $P_2'$ of the primary light collector 120 or 120' are set to be different has been exemplified in FIG. 7A, FIG. 7B, FIG. 9A and FIG. 9B, a setting of an optical axis is not limited to the above description.

That is, in both the backlight unit 100 having the transmission type light collecting structure and the backlight unit 100' having the reflection type light collecting structure, the optical axis $P_1$ or $P_1'$ of the light source 110 or 110' and the optical axis $P_2$ or $P_2'$ of the primary light collector 120 or 120' may be set to coincide with each other. In this case, the optical axis $P_2$ or $P_2'$ of the primary light collector 120 or 120' may be set to be disposed to be different from an optical axis (not shown) of the secondary light collector 130 or 130'.

That is, when the primary light collector 120 is configured with a plurality of lenses, an optical axis of each of the plurality of lenses may be set to coincide with the optical axis of the light source 110 and be disposed to be different from the optical axis of the secondary light collector 130. Further, even when the primary light collector 120' is a reflection type reflector, an optical axis including the center of a light emitting surface of the reflection type reflector may be set to be disposed to be different from the optical axis of the secondary light collector 130'.

Even when the optical axis of the reflection type reflector is set as described above, a light distribution including central light is not parallel to the optical axis and the central light is deviated from the optical axis and propagates.

Hereinafter, a brightness distribution in the backlight unit 100 or 100' according to one embodiment of the present disclosure will be described with reference to FIG. 10A to FIG. 11C.

Figure 10A:
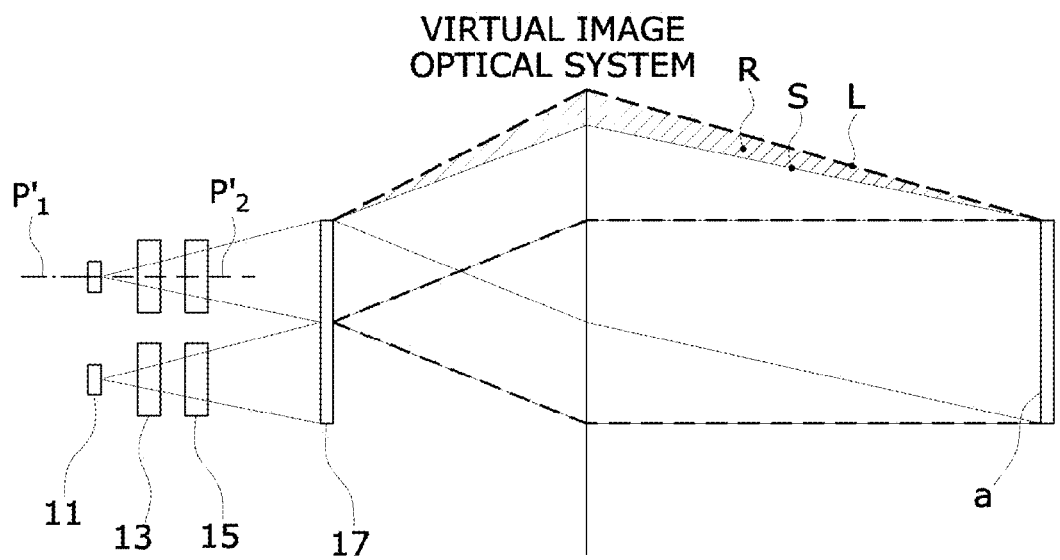
FIGS. 10A, 10B and 10C are diagrams for describing a brightness distribution in an optical axis coincidence type optical system according to the related art.
Figure 10B:
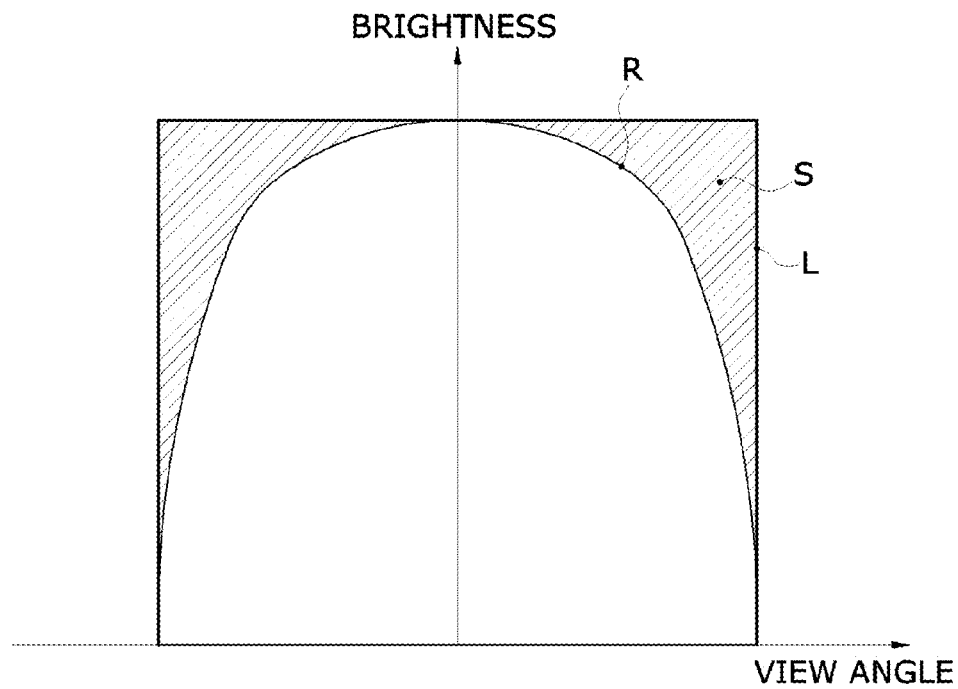
Figure 10C:
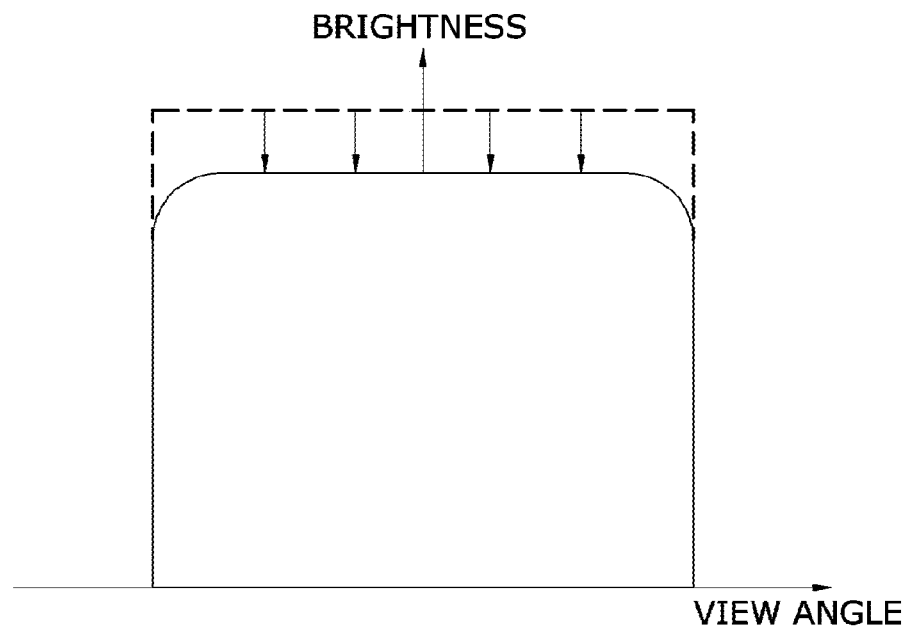
Figure 11A:
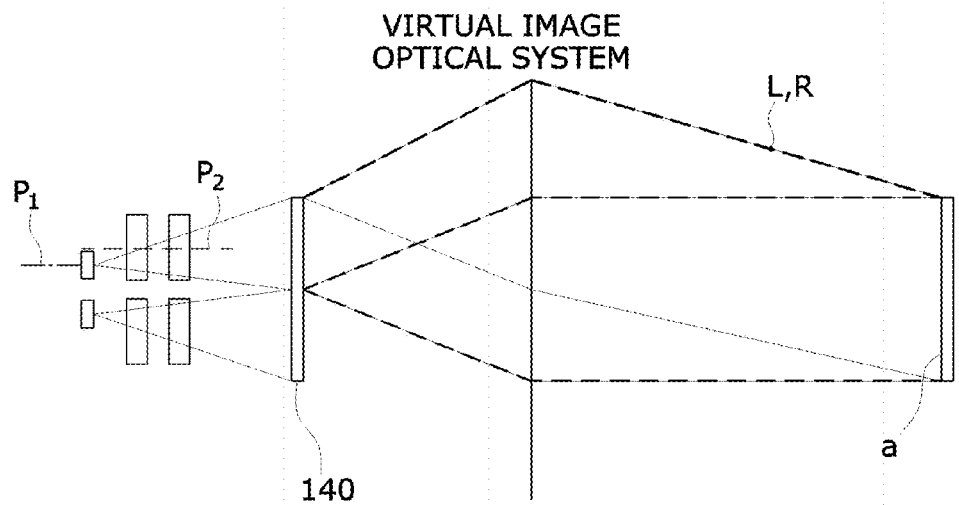
FIGS. 11A, 11B and 11C are diagrams for describing a brightness distribution in a backlight unit according to one embodiment of the present disclosure.
Figure 11B:
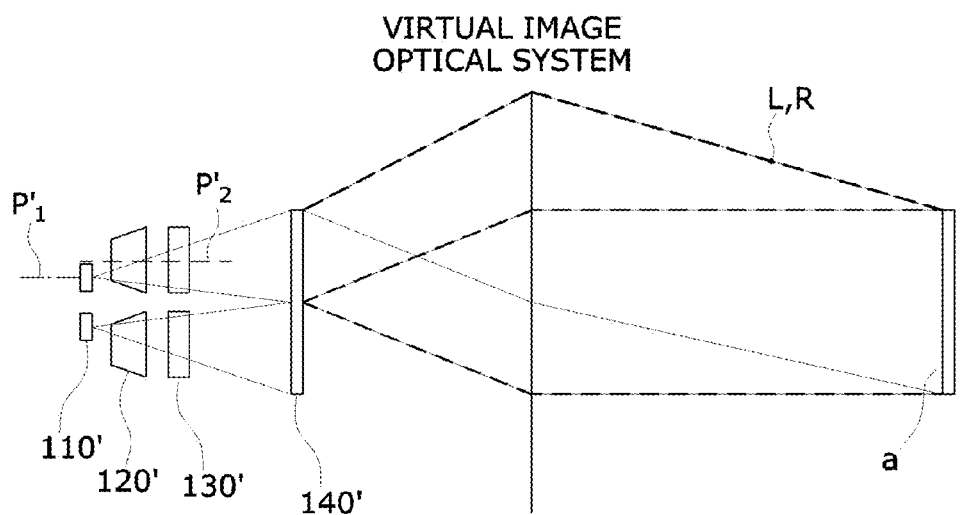
Figure 11C:
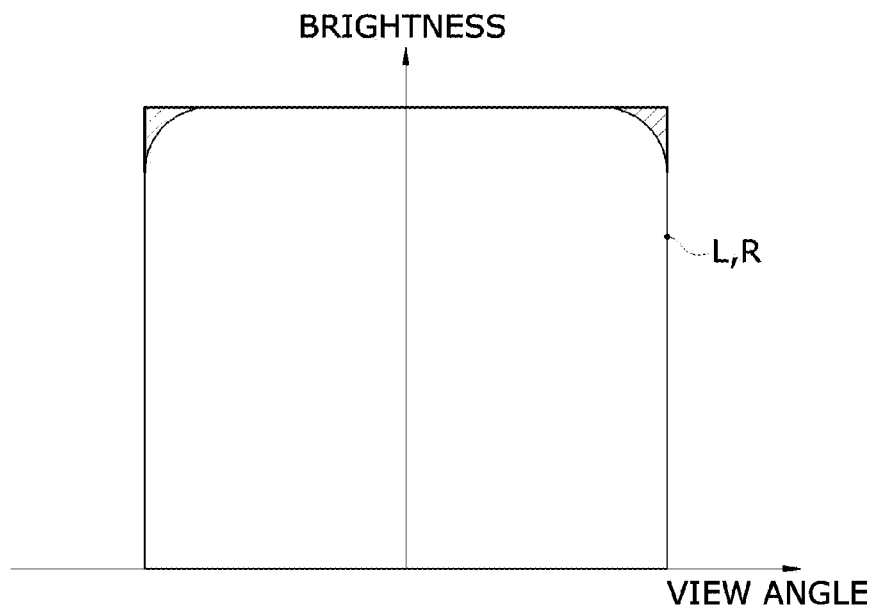

FIG. 10A to FIG. 10C are diagrams for describing a brightness distribution in an optical axis coincidence type optical system according to a related art, and FIG. 11A to FIG. 11C are diagrams for describing a brightness distribution in the backlight unit 100 or 100' according to one embodiment of the present disclosure.

In the case of a structure in which the optical axis coincidence type ($P_1=P_2$) optical system shown in FIG. 10A is employed, light is transmitted up to an outermost region R by a backlight unit, but an insufficient region S is present on an inside of an outermost line L of light required for presenting a virtual image. Therefore, in the case of the optical axis coincidence type optical system, a problem in that brightness uniformity at a lateral surface is degraded as show in FIG. 10B occurs.

To compensate for such a problem, a method in which a scattering angle of a diffuser is set to be large exists to solve the problem, but this method causes a problem in that since the scattering angle is set to be large in a central view as shown in FIG. 10C and efficiency of a system is reduced, brightness of a virtual optical system is decreased.

As an alternative method, a method for increasing the number of light sources and the number of primary light collectors exists, but this method causes a problem in that the number of components is increased and manufacturing costs raise.

Conversely, in the backlight unit 100 or 100' according to one embodiment of the present disclosure, as in the transmission type light collecting structure shown in FIG. 11A and the reflection type light collecting structure shown in FIG. 11B, the optical axis $P_1$ or $P_1'$ of the light source 110 or 110' and the optical axis $P_2$ or $P_2'$ of the primary light collector 120 or 120' are set to be different.

In addition, as is described above, the optical axis $P_1$ or $P_1'$ of the light source 110 or 110' is set to coincide with the optical axis $P_2$ or $P_2'$ of the primary light collector 120 or 120', whereas, the optical axis $P_2$ or $P_2'$ of the primary light collector 120 is 120' are set to be disposed to be different from the optical axis (not shown) of the secondary light collector 130 or 130'.

That is, an off-axis optical system type, in which one optical axis among the optical axis $P_1$ or $P_1'$ of the light source 110 or 110', the optical axis $P_2$ or $P_2'$ of the primary light collector 120 or 120', and the optical axis (not shown) of the secondary light collector 130 or 130' is set to be disposed to be different from the other two, is applied to one embodiment of the present disclosure.

Therefore, in one embodiment of the present disclosure, the light distribution is deviated and light propagates such that the insufficient region S does not occur between the region R in which the light is emitted up to the outermost region by the backlight unit 100 or 100', and the outermost line L of the light required for presenting the virtual image. That is, the light distribution is deviated and light propagates such that the insufficient region S is compensated for so that a required region L and the supplied region R may coincide with each other. Consequently, as shown in FIG. 11C, brightness degradation around the eyebox a may be prevented without increasing the scattering angle of the diffuser 140 or 140', and efficiency of the system may be increased.

According to one of the above-described embodiments of the present disclosure, brightness may be improved and brightness uniformity may be increased using the off-axis optical structure between a light source of a picture generation unit (PGU) for a head-up display apparatus and light collecting components.

Thus, visibility of driving information may be increased while a driver drives a vehicle, and thus convenience of the driver may be improved.

In addition, brightness and brightness uniformity of the system may be improved without additional components so that a manufacturing process may be simplified.

Also, it is not necessary for an additional light source to be used to compensate for degradation of brightness of a peripheral portion, and thus the number of components may be decreased to reduce manufacturing costs and a weight of a product.

The above-described description of the present disclosure is intended to be illustrative in purpose only, and those skilled in the art should easily understand that other concrete forms can be devised without changing or modifying the technical spirit or essential characteristics of the present disclosure. Therefore, it should be understood that the above-described embodiments are not restrictive but illustrative in all aspects. For example, each component described as a single form may be distributed and implemented, and similarly, components described as being distributed may also be implemented in a combined form.

The scope of the present disclosure is defined by the appended claims rather than the detailed description, and all changes or modifications derived from the meaning and scope of the claims and equivalents thereto should be construed as being included within the scope of the present disclosure.

What is claimed is:

1. A backlight unit in a head-up display, comprising:
a plurality of light sources configured to emit light;
a plurality of primary light collectors configured to collect the light emitted by the plurality of light sources to transmit, refract, or reflect the collected light; and
a secondary light collector configured to recollect the light which is collected by the plurality of primary light collectors,
wherein an optical axis of one among the plurality of light sources, the plurality of primary light collectors, and the secondary light collector is disposed to be different from the other two,
wherein the optical axis of the light source is disposed to be different from the optical axis of the primary light collector.

2. The backlight unit of claim 1, further comprising:
a diffuser disposed between the primary light collector and the secondary light collector or between the secondary light collector and a display panel, and configured to diffuse incident light.

3. The backlight unit of claim 1, wherein the plurality of primary light collectors comprises a plurality of lenses, and
each of the plurality of lenses is configured to collect the light emitted by each of the plurality of light sources to transmit and refract the collected light.

4. The backlight unit of claim 3, wherein each of the plurality of lenses is a spherical or aspherical surface lens, and
the optical axis of each of the plurality of primary light collectors is set to be a rotational axis of each of the plurality of lenses.

5. The backlight unit of claim 1, wherein the plurality of primary light collectors are a plurality of reflection type reflectors, and
each of the plurality of reflection type reflectors is configured to collect and reflect the light emitted by each of the plurality of light sources.

6. The backlight unit of claim 5, wherein an optical axis including a center of a light incident part of the reflection type reflector is set to be disposed to be different from an optical axis including a center of a light emitting part of the reflection type reflector, and
the optical axis of the light source is disposed to be different from the optical axis including the center of the light emitting part.

7. The backlight unit of claim 1, wherein the plurality of primary light collectors comprises a plurality of lenses, and
the optical axis of each of the plurality of light sources is disposed to be different from one or more of an optical axis including a center of a light incident surface of each of the plurality of lenses and an optical axis including a center of a light emitting surface of each of the plurality of lenses.

8. The backlight unit of claim 1, wherein the optical axis of the primary light collector is disposed to be different from the optical axis of the secondary light collector.

9. The backlight unit of claim 8, wherein the plurality of primary light collectors are a plurality of lenses, and
each of the plurality of lenses collects the light emitted by each of the light sources to transmit and refract the collected light.

10. The backlight unit of claim 9, wherein each of the plurality of lenses is a spherical or aspherical surface lens, and the optical axis of each of the plurality of primary light collectors is set to a rotational axis of each of the plurality of lenses.

11. A backlight unit in a head-up display comprising:

a plurality of light source configured to emit light;

a plurality of primary light collectors configured to collect the light emitted by the plurality of light sources to transmit, refract, or reflect the collected light; and a secondary light collector configured to recollect the light which is collected by the plurality of primary light collectors, wherein an optical axis of one among the plurality of light sources, the plurality of primary light collectors, and the secondary light collector is disposed to be different from the other two, wherein the optical axis of the light source is disposed to coincide with the optical axis of the primary light collector, and the optical axis of the primary light collector is disposed to be different from the optical axis of the secondary light collector, wherein the plurality of primary light collectors are a plurality of lenses, and each of the plurality of lenses collects the light emitted by each of the light sources to transmit and refract the collected light.

wherein each of the plurality of lenses is a aspherical or aspherical surface lens, and the optical axis of each of the plurality of primary light collectors is set to a rotational axis of each of the plurality of lenses, wherein the plurality of primary light collectors are a plurality of reflection type reflector, and each of the plurality of reflection type reflectors is configured to collect and reflect the light emitted by each of the plurality of light sources.

12. The backlight unit of claim 11, wherein an optical axis including a center of a light incident part of the reflection type reflector is set to be disposed to be different from an optical axis including a center of a light emitting part of each the reflection type reflector, and the optical axis of the light source is disposed to be different from the optical axis including the center of the light emitting part.

* * * * *